United States Patent
Hamada et al.

(10) Patent No.: US 7,792,865 B2
(45) Date of Patent: Sep. 7, 2010

(54) INFORMATION PROCESSING DEVICE, CONTENT MANAGEMENT METHOD, CONTENT INFORMATION MANAGEMENT METHOD, AND COMPUTER PROGRAM

(75) Inventors: Masaaki Hamada, Tokyo (JP); Norifumi Kikkawa, Tokyo (JP); Yoichi Kobori, Kanagawa (JP); Takehiko Morita, Kanagawa (JP); Toshihiro Morita, Kanagawa (JP); Yoshiki Tanaka, Tokyo (JP); Noriyuki Sakoh, Kanagawa (JP); Tatsuya Igarashi, Tokyo (JP)

(73) Assignee: Sony Corporation, Tokyo (JP)

( * ) Notice: Subject to any disclaimer, the term of this patent is extended or adjusted under 35 U.S.C. 154(b) by 361 days.

(21) Appl. No.: 10/543,469

(22) PCT Filed: Dec. 16, 2003

(86) PCT No.: PCT/JP03/16086

§ 371 (c)(1),
(2), (4) Date: Jul. 28, 2005

(87) PCT Pub. No.: WO2004/068355

PCT Pub. Date: Aug. 12, 2004

(65) Prior Publication Data

US 2006/0059168 A1    Mar. 16, 2006

(30) Foreign Application Priority Data

Jan. 29, 2003  (JP) .............................. 2003-019819

(51) Int. Cl.
*G06F 7/00* (2006.01)

(52) U.S. Cl. ...................................... 707/796; 709/201

(58) Field of Classification Search ..................... 707/3, 707/4, 100, 104.1, 10, 101, 102, 705, 763, 707/790, 791, 793, 796, 805; 709/201, 202, 709/203, 217, 219

See application file for complete search history.

(56) References Cited

U.S. PATENT DOCUMENTS

| 2001/0039615 A1 | 11/2001 | Bowker et al. | |
| 2002/0073167 A1* | 6/2002 | Powell et al. | 709/217 |
| 2002/0133491 A1* | 9/2002 | Sim et al. | 707/10 |

(Continued)

FOREIGN PATENT DOCUMENTS

JP    10-303986    11/1998

(Continued)

*Primary Examiner*—Greta L Robinson
(74) *Attorney, Agent, or Firm*—Finnegan, Henderson, Farabow, Garrett and Dunner, L.L.P.

(57) ABSTRACT

An apparatus and a method are provided, which enable to perform an improved management processing based on an identifier information of a content on a server. The content providing server sets content-associated unique identifier information as property information that is a component of content-associated metadata, maintains the unique identifier information as content-associated metadata without changing the unique identifier information even if the logical/physical position of a content stored in the storage unit is changed, and maintains a setting value of unique identifier information, which is set associated with a received content, as metadata associated with the received content without changing the setting value of the unique identifier information. By this configuration, even if a content is moved between servers, a client can acquire the content based on the unique identifier.

15 Claims, 11 Drawing Sheets

U.S. PATENT DOCUMENTS

| | | | |
|---|---|---|---|
| 2003/0088573 A1* | 5/2003 | Stickler | 707/100 |
| 2004/0002991 A1* | 1/2004 | Bogdan et al. | 707/102 |
| 2004/0167878 A1* | 8/2004 | Doddington | 707/3 |

FOREIGN PATENT DOCUMENTS

| | | |
|---|---|---|
| JP | 2002-237169 | 1/2002 |
| JP | 2002-247024 | 8/2002 |
| JP | 2001-333410 | 10/2002 |
| JP | 2002-304371 | 10/2002 |

* cited by examiner

| PROPERTY NAME | TYPE | MULTIPLE | PROPERTY DESCRIPTION |
|---|---|---|---|
| av:totalSize | UNSIGNED LONG | NO | SIZE OF RESOURCE CONTAINED IN CONTAINER (ORIGINAL SIZE). THE SIZE MAY BE AN APPROXIMATE VALUE. EXPRESSED IN BYTES |
| av:totalDuration | DURATION | NO | TOTAL TIME OF RESOURCE CONTAINED IN CONTAINER. THE TIME MAY BE AN APPROXIMATE VALUE. |
| @id | STRING | NO | ID UNIQUE IN CONTENT DIRECTORY. @id OF ROOT CONTAINER IS 0. 64 CHARACTERS FOR UFT-16 (≈UNICODE)(64 BYTES PREPARED FOR UTF-8 IN ASCII-ONLY SERVER AND 192 BYTES IN KANJI CHARACTER SERVER, AND ALWAYS A MAXIMUM OF 192 BYTES PREPARED FOR CLIENT) |
| @parentID | STRING | NO | @id OF PARENT CONTAINER. @parentID OF ROOT CONTAINER IS -1. |
| @refID | STRING | NO | @id OF REFERENCE OBJECT |
| @av:NCUID | NCUID | NO | NETWORK CONTENT UNIQUE ID OF OBJECT |
| @av:refNCUID | NCUID | NO | NETWORK CONTENT UNIQUE ID OF REFERENCE OBJECT |
| @av:parentNCUID | NCUID | NO | NETWORK CONTENT UNIQUE ID OF PARENT OBJECT |

Fig. 4

| CONTENT TITLE | ARTIST | CONTENT NCUID |
|---|---|---|
| ABC ··ff | Haserw ··· | 648ac776 ··· |
| CDSA ··ss | ··· | ··· |
|  |  |  |

*Fig. 6*

INFORMATION PROCESSING DEVICE, CONTENT MANAGEMENT METHOD, CONTENT INFORMATION MANAGEMENT METHOD, AND COMPUTER PROGRAM

TECHNICAL FIELD

The present invention relates to an information processing apparatus, a content management method, a content information management method, and a computer program. More specifically, the present invention relates to an information processing device, a content management method, a content information management method, and a computer program that allow the user to specify a unique identifier for a content stored in a content providing server and to efficiently manage the content based on the specified unique identifier in a networked device configuration such as a home network.

BACKGROUND ART

As a data communication network becomes more and more popular today, a so-called home network where electrical home appliances, computers, and other peripheral units are networked for communication among them is becoming widely used in the home. A home network, which allows communication among networked devices to share the data processing function and to transfer contents among them, provides the user with convenience and comfort. It is expected that a home network will become more widely used in future.

One of the protocols designed for the configuration of such a home network is Universal Plug and Play (UPnP: Universal Plug and Play). Universal Plug and Play (UPnP) allows the user to easily build a network without complicated operations and allows the user on a networked device to receive the services provided by the connected devices without difficult operations and settings. Another advantages with UPnP is that it does not depend on the OS (Operating System) stored in a device and that devices can be added easily.

Under UPnP, a definition file conforming to XML (extensible Markup Language) is exchanged among devices for mutual recognition. The overview of UPnP is as follows:

(1) Addressing processing for acquiring its own device ID such as an IP address (2) Discovery processing for searching for the devices in the network and, upon receiving responses from the devices, acquiring information, such as the device type and the function, included in the responses.

(3) Service request processing for requesting a device to provide a service based on the information acquired by the discovery processing By executing the processing procedure described above, the services can be provided and received by devices connected to the network. A device newly connected to a network can perform the addressing processing described above to acquire the device ID, perform the discovery processing to acquire information on other devices connected to the network and, based on the acquired information, issue a service request to the other devices.

For example, when a client wants to play back a content, such as music data and image data stored in a server, on the client side device, the client side sends an acquisition request to the server to request it to send various types of content attribute information stored in the server, such as the title or the artist name of a tune or a movie, data compression mode information (ATRAC: adaptive transform acoustic coding, MPEG: moving picture experts group, etc.) and, as necessary, copyright information. This attribute information is called metadata or meta information.

In response to the request from the client, the server sends metadata (attribute information) on the content, stored in the server, to the client. Based on the metadata acquired from the server, the client displays the content information on the display of the client device according to the predetermined display program. For example, the tune list composed of artist names and titles is displayed on the display. Based on the display information, the user checks or selects a content to be played back and sends a content transmission request to the server. The server receives the content request from the client and, according to the received request, sends the content to the client, and the client side plays back the received content.

In this way, a content stored in the server in the home network can be accessed from other devices connected to the network. For example, a device connected based on the UPnP connection that is a simple device connection configuration described above can acquire a content. When the content is movie data or music data, a TV set or a player, if used as a network connection device, enables the user to watch a movie or listen to music.

However, according to the specification defined by current UPnP, a server that stores contents therein and supplies the contents to the users (clients) has a configuration in which the server assigns at its discretion an identifier (ID) to a content stored in its own storage unit and manages the assigned ID.

When contents are managed in this way, different identifiers (IDs) are assigned to stored contents according to the storage servers even if the contents are the same. For example, when a content has been moved from server A to server B that is a different server, the problem is that, even if the client memorizes the ID corresponding to the content acquired from server A, the user cannot acquire the same content from server B based on the memorized ID.

Integrated management of contents in one fixed server in a home network configuration, where many devices can be connected, would generate a storage capacity problem or a processing load problem. Therefore, the ability to move contents is vital in building a flexible network system. In such a case, if different identifiers are assigned to a content that is moved from one server to another, the efficiency of content management by the user (client) would be decreased.

When a content is recorded on a plurality of recording media in a home server, a configuration in which contents are managed by using different identifiers based on information unique to each recording medium is described, for example, in Patent Document 1 (Japanese Patent Application Publication No. JP2002-237169).

In the configuration described in Patent Document 1, an ID such as "Recording media ID+Content ID" is set as the management ID. Before a content is copied, a copy of the content is created and one record is added to the database. To execute checkout processing in which the entity of the content is moved from an HDD to an optical disc, the recording media ID is set to an optical disc and the content ID is also changed as necessary. To execute check-in processing that is the reverse of check-out processing, the identifier is changed. To execute export processing in which the content is written to an optical disc for movement to another database, the record is deleted from the database. To execute import processing in which an exported content is registered in a database, the recording media ID and the content ID are newly set and other additional information is data read from the optical disc. The ID management configuration like this is described in that document.

As described above, the devices in the conventional configuration such as a server in which contents are stored, the identifiers (IDs) corresponding to contents are individually set and the contents are usually managed based on the IDs that are set. Such a configuration requires the user to change the identifier as the content is moved as described above, and this requirement decreases the content management efficiency of the client.

DISCLOSURE OF THE INVENTION

In view of the problems in the conventional technologies described above, it is an object of the present invention to provide an information processing apparatus, a content management method, a content information management method, and a computer program that increase the user's convenience of content search processing by building a management configuration in which a content-associated unique identifier is set in the attribute information on a content held by a content storing server and in which the content-associated identifier is not changed even if the content is moved to a different device so that the same ID is associated with the same content even in different servers.

According to a first aspect of the present invention, an information processing apparatus that functions as a content providing server for executing content transmission processing in response to a request from a client is characterized by comprising:

a storage unit for storing a content and metadata that is content attribute information;

a data transmission/reception unit for executing data transmission/reception processing; and a control unit for setting content-associated unique identifier information as property information that is a component of content-associated metadata, for maintaining the unique identifier information as content-associated metadata without changing the unique identifier information even if the logical/physical position of a content stored in the storage unit is changed, and for managing a setting value of unique identifier information, which is set associated with a content received via the data transmission/reception unit, as metadata associated with the received content without changing the setting value.

One embodiment of the information processing apparatus according to the present invention is characterized in that the control unit performs content search based on the unique identifier information in response to a content request, in which the unique identifier information is stored, from a client.

One embodiment of the information processing apparatus according to the present invention is characterized in that, when a content is output to some other apparatus, the control unit outputs unique identifier information, which is set in property information that is a component of metadata associated with the output content, to the other device.

One embodiment of the information processing apparatus according to the present invention is characterized in that, when a content to which the unique identifier information is not assigned is newly stored, the control unit generates a new unique identifier and sets the generated new unique identifier as fixed unique identifier information associated with the newly stored content.

One embodiment of the information processing apparatus according to the present invention is characterized in that unique identifier information that is set in property information that is a component of metadata associated with a content includes a unique identifier associated with the content [NCUID], a unique identifier of an object related to the content [refNCUID], and a unique identifier of a parent object in a content management directory [parentNCUID] and in that the control unit manages the values of the [NCUID], [refNCUID], and [parentNCUID] as the fixed values of property information constituting metadata associated with a stored content.

According to a second aspect of the present invention, an information processing apparatus that functions as a client for executing content playback processing is characterized by comprising:

a data transmission/reception unit for sending and receiving data to and from a server that has a content and content attribute information;

a control unit for acquiring unique identifier information that is content-associated unique identifier information included in property information and that is set as a fixed value even if the content is moved between apparatuses, for generating a unique identifier management table associating the unique identifier information with other property information included in the metadata, and for storing the generated table in a storage unit, the property information being a component of metadata that is content attribute information received from the server via the data transmission/reception unit; and the storage unit for storing the unique identifier management table.

One embodiment of the information processing apparatus according to the present invention is characterized in that, when a content request is issued to the server, the control unit checks whether unique identifier information on the requested content is already registered in the unique identifier management table, acquires unique identifier information registered in the unique identifier management table if the unique identifier information is registered, generates a content request packet in which the acquired unique identifier information is set as a search key, and executes the control of outputting the content request packet to the content providing server.

One embodiment of the information processing apparatus according to the present invention is characterized in that the transmission of the content request packet is executed as the processing of multicast transmission to a plurality of servers.

According to a third aspect of the present invention, a content management method for use in a content delivery server is characterized by comprising:

a step of detecting content-associated unique identifier information that is set in a content received from some other device;

a property information setting step of setting the unique identifier information as property information constituting the metadata on the received content without changing the value; and a storing step of storing the received content and metadata that includes the unique identifier information as property information, the received content being associated with the metadata.

One embodiment of the content management method according to the present invention is characterized in that the content management method further comprises the step of executing content search based on the unique identifier information in response to a content request in which the unique identifier information from a client is included.

One embodiment of the content management method according to the present invention is characterized in that the content management method further comprises the step of, when a content is output to some other apparatus, outputting unique identifier information, which is set in property information that is a component of metadata associated with the output content, to the other apparatus.

One embodiment of the content management method according to the present invention is characterized in that the content management method further comprises the step of, when a content to which the unique identifier information is not assigned is newly stored, generating a new unique identifier and setting the generated new unique identifier as fixed unique identifier information associated with the newly stored content.

One embodiment of the content management method according to the present invention is characterized in that the property information setting step sets a unique identifier associated with a content [NCUID], a unique identifier of an object related to the content [refNCUID], and a unique identifier of a parent object in a content management directory [parentNCUID], all of which are included in unique identifier information that is set in property information that is a component of metadata associated with the content, as property information associated with the received content without changing the values and in that the storing step stores the received content and metadata, which includes [NCUID], [refNCUID], and [parentNCUID] as the property information, with the received content associated with the metadata.

According to a fourth aspect of the present invention, a content information management method is characterized by comprising:

a content attribute information receiving step of receiving content attribute information from a server;

a step of acquiring unique identifier information that is content-associated unique identifier information included in property information and that is set as a fixed value even if the content is moved between apparatuses, the property information being a component of metadata that is content attribute information; and a step of generating a unique identifier management table associating the unique identifier information with other property information included in the metadata for storing the generated table in a storage unit.

One embodiment of the content information management method according to the present invention is characterized in that, when a content request is issued to the server, the content information management method further comprises the steps of checking whether unique identifier information on the requested content is already registered in the unique identifier management table; acquiring unique identifier information registered in the unique identifier management table if the unique identifier information is registered; generating a content request packet in which the acquired unique identifier information is set as a search key; and executing the control of outputting the content request packet to the content providing server.

One embodiment of the content information management method according to the present invention is characterized in that the transmission of the content request packet is executed as the processing of multicast transmission to a plurality of servers.

According to a fifth aspect of the present invention, a computer program for executing content management processing in a content delivery server is characterized by comprising:

a step of detecting content-associated unique identifier information that is set in a content received from some other apparatus;

a property information setting step of setting the unique identifier information as property information constituting the metadata on the received content without changing the value; and a storing step of storing the received content and metadata that includes the unique identifier information as property information, the received content being associated with the metadata.

According to a sixth aspect of the present invention, a computer program for executing content information management processing is characterized by comprising:

a content attribute information receiving step of receiving content attribute information from a server;

a step of acquiring unique identifier information that is content-associated unique identifier information included in property information and that is set as a fixed value even if the content is moved between devices, the property information being a component of metadata that is content attribute information; and a step of generating a unique identifier management table associating the unique identifier information with other property information included in the metadata for storing the generated table in a storage unit.

According to the configuration of the present invention, the content providing server sets content-associated unique identifier information as property information that is a component of content-associated metadata, maintains the unique identifier information as content-associated metadata without changing the unique identifier information even if the logical/physical position of a content stored in the storage unit is changed, and maintains a setting value of unique identifier information, which is set associated with a received content, as metadata associated with the received content without changing the setting value of the unique identifier information. Therefore, even if a content is moved between servers, a client can acquire the content based on the unique identifier.

According to the configuration of the present invention, a client that executes content playback processing generates a unique identifier management table associating content-associated unique identifier information, included in property information in content attribute information received from the server, with other property information and stores the generated table in a storage unit. Because the unique identifier remains unchanged even if the content is moved between servers, the content can be acquired based on the unique identifier that is stored data without acquiring attribute information from a server in which the content is newly stored and therefore the content can be acquired more efficiently.

The computer program according to the present invention is a computer program that can be provided to a general-purpose computer system, capable of executing various types of program code, by a computer-readable recording medium or communication medium, for example, a recording medium such as a CD, an FD, or an MO or a communication medium such as a network. Providing such a program in a computer-readable form enables processing to be executed on the computer system according to the program.

Other objects, features, and advantages of the present invention will be made more apparent by the detailed description based on the embodiment of the present invention described below or accompanying drawings. The system in this specification, which refers to a logically aggregated configuration of a plurality of apparatuses, is not limited to a system where the apparatuses, each having its own configuration, are included in one cabinet.

BRIEF DESCRIPTION OF DRAWINGS

FIG. 4 is a diagram showing an example of property information that is a component of metadata stored in a server.

FIG. 6 is a diagram showing an example of the configuration of an NCUID management table stored in a client.

BEST MODE FOR CARRYING OUT THE INVENTION

With reference to the drawings, an information processing apparatus, a content management method, a content information management method, and a computer program according to the present invention will be described in detail.

[System Overview]

Figure 1:
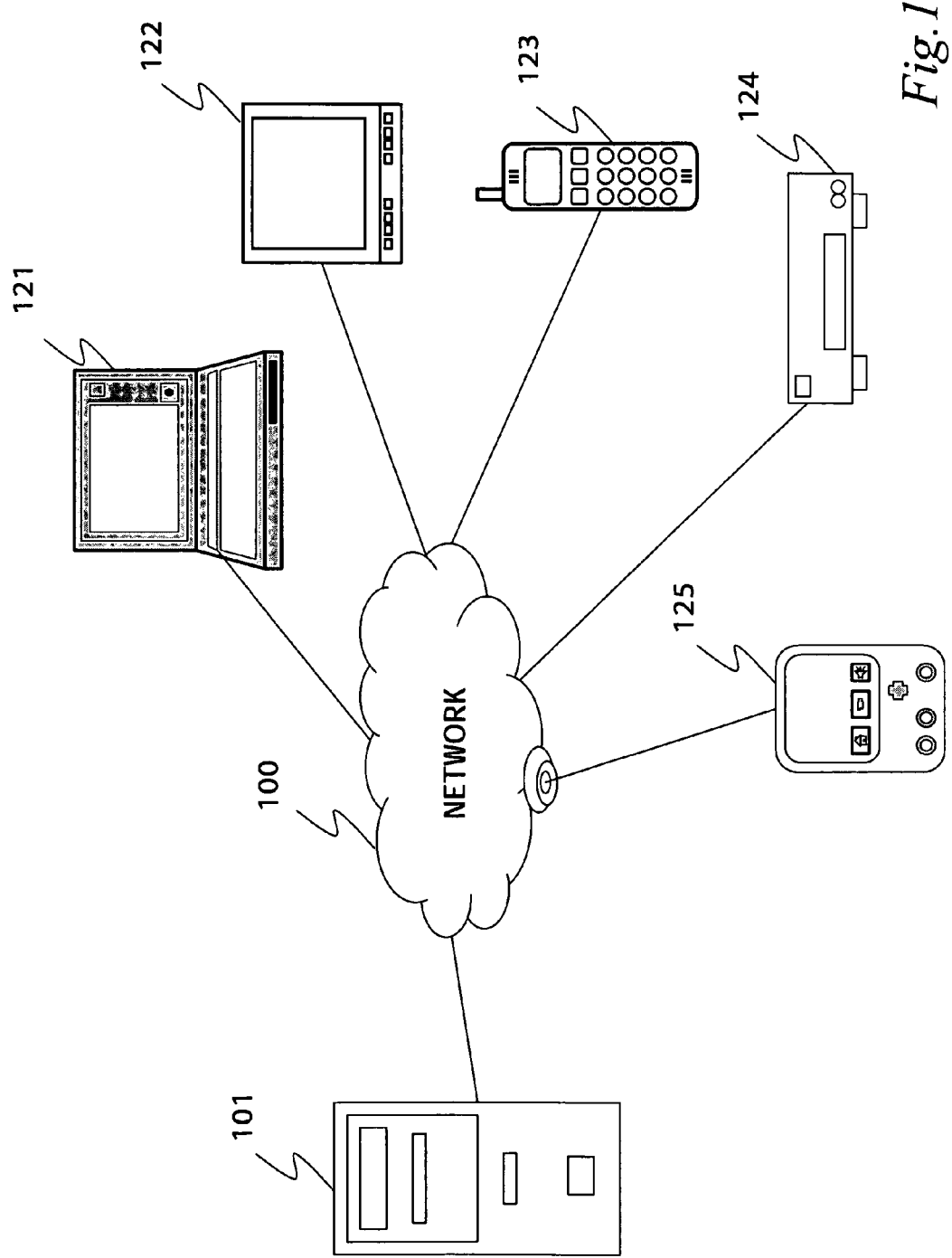
FIG. 1 is a diagram showing an example of a network configuration to which the present invention is applicable.

First, with reference to FIG. 1, the following describes an example of a network configuration to which the present invention is applicable. FIG. 1 shows a configuration, such as a home network configuration, in which a server 101 that executes processing in response to processing requests from various client apparatuses and the client apparatuses that issue processing requests to the server 101 are connected via a network 100. The client apparatuses include a PC 121, a monitor 122, a cellular phone 123, a player 124, and a PDA 125. Various other electronic devices and electrical household appliances can also be connected as client apparatuses.

Processing executed by the server 101 in response to a request from a client includes the provision of contents stored in storage means such as a hard disk owned by the server 101 or the provision of data processing services through the execution of an application program executable by the server. Although the server 101 and the client apparatus are shown as two separate devices in FIG. 1, only a device that provides a service in response to a request from a client is shown as a server. Any client apparatus that provides its own data processing service to other clients can provide the function as a server. Therefore, the client apparatuses connected to the network shown in FIG. 1 can also act as a server.

The network 100 is a wired or wireless network, and the connected devices send and receive communication packets such as Ethernet (registered trademark) frames via the network 100. That is, a client sends a data processing request to the server 101 by sending an Ethernet frame, whose data portion contains processing request information, to the server 101. Upon receiving the processing request frame, the server 101 executes data processing, stores result data generated as a result of the data processing into the data portion of the communication packet as necessary, and sends the packet to the client.

The devices connected to the network are, for example, devices conforming to Universal Plug and Play (UPnP: Universal Plug and Play). Therefore, devices can be added to and deleted from the network easily. A device newly added to the network performs the following:

(1) Addressing processing for acquiring its own device ID such as an IP address (2) Discovery processing for searching for devices in the network and, upon receiving responses from the device, acquiring information, such as the device type and the function, included in the responses.

(3) Service request processing for requesting a device to provide a service based on the information acquired by the discovery processing By executing the processing procedure described above, the services can be received by devices connected to the network.

Figure 2:
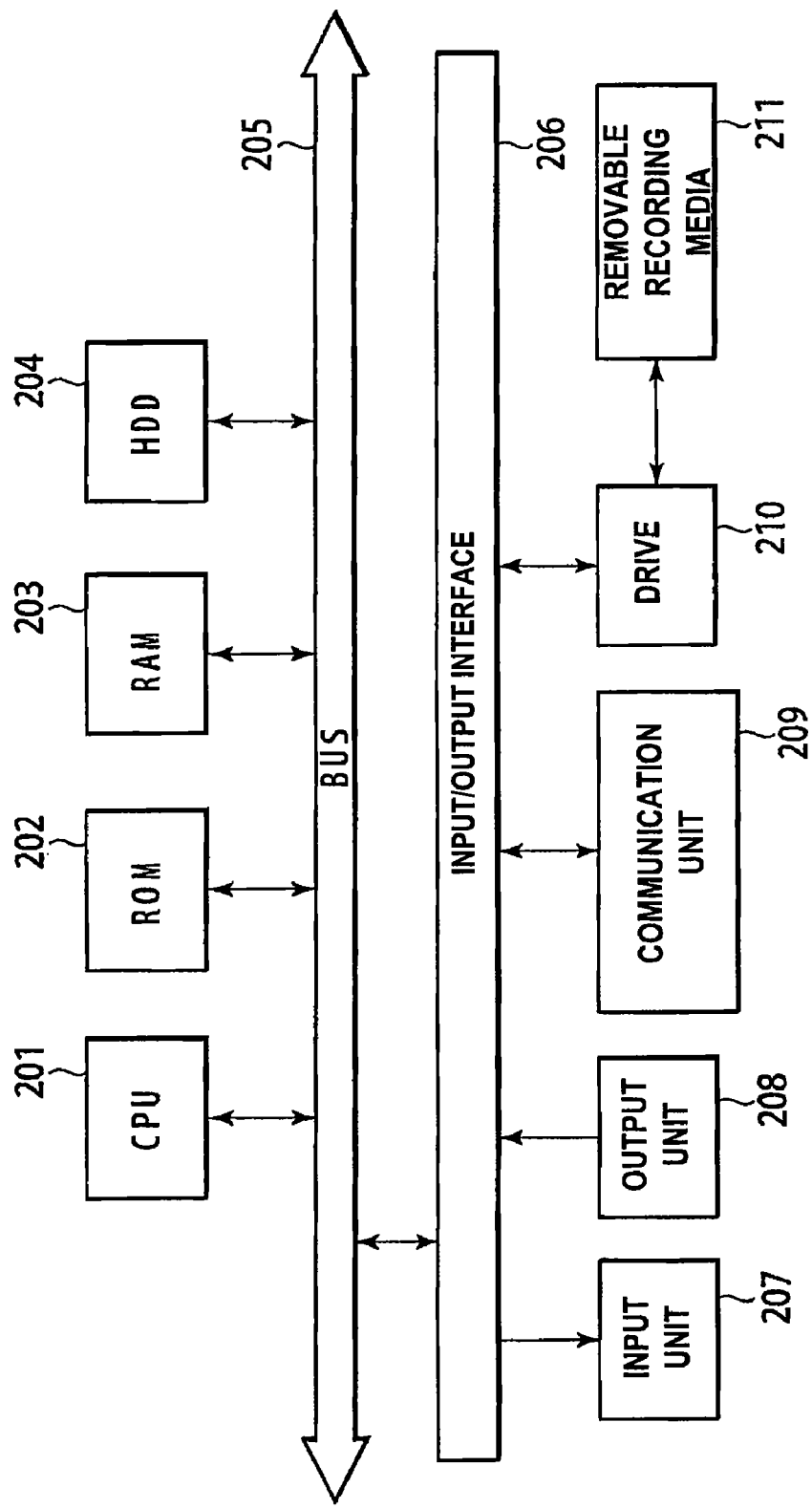
FIG. 2 is a diagram showing an example of the configuration of networked devices.

With reference to FIG. 2, the following describes an example of the hardware configuration of a PC that is an example of an information processing apparatus configuring the server and the client apparatuses shown in FIG. 1.

A CPU (Central Processing Unit) 201 executes various types of processing according to the programs stored in a ROM (Read Only Memory) 202 or an HDD 204 to function as data processing means or communication control processing means. A RAM 203 stores programs to be executed by the CPU 201 as well as data as necessary. The CPU 201, ROM 202, RAM 203, and HDD 204 are interconnected via a bus 205.

An input/output interface 206 is connected to the bus 205. To this input/output interface 206 are connected an input unit 207, which is configured by a user-operated keyboard, switches, buttons, and a mouse, and an output unit 208 which is configured by an LCD, a CRT, and a speaker for presenting various types of user information. Also connected to this input/output interface 206 are a communication unit 209, which functions as data transfer means, and a drive 210 to which a removable recording medium 211 such as a magnetic disk, an optical disc, an magnetic optical disk, or a semiconductor memory can be connected and which reads data from and writes data to those removable recording media 211.

The configuration shown in FIG. 2 is an example of the server, or the personal computer (PC), that is an example of a device connected to the network shown in FIG. 1. The devices connected to the network are not limited to a PC but, as shown in FIG. 1, can include a portable communication terminal such as a cellular phone and a PDA and various electronic devices and information processing apparatuses such as a player and a display. Therefore, a device can have its own hardware configuration for executing processing according to the hardware.

[Metadata]

Next, the following describes metadata stored in the server in which contents to be provided to clients are stored. The server has attribute information as metadata, wherein the attribute information corresponds to the contents such as image data on still images and moving images and audio data such as music stored in its storage unit.

The contents such as image data such as still images and moving images and audio data such as music stored in the server are called collectively as AV contents. The AV contents are managed in the server by a hierarchically structured content directory.

The content directory has a hierarchical structure of folders each of which contains an AV content or a plurality of AV contents. An element of the content directory, that is, each folder containing an AV content or a plurality of AV contents is called an object. An object is a generic term for a data unit processed by the server and, in addition to folders containing an AV content or a plurality of AV contents, there are various objects.

The minimum unit of an AV content, such as one piece of music data, one piece of moving image data, or one piece of still image data, is called an item.

Objects are classified into classes, for example, music (Audio), video (Video), and photograph (Photo), according to the types, and each object is labeled a class. A client can specify a specific class to search for only objects belonging to a specific classification. In the server, classes are managed also in a hierarchical configuration with subclasses under each class.

Metadata is composed of various types of management information including attribute information corresponding to contents stored in the server, class definition information, and hierarchical information on the content directory. Metadata, which is the attribute information on a content defined corresponding to each object, includes various types of information such as the identifier (ID), data size, resource information, title, artist name, and copyright information on the content. Each piece of information included in metadata is called a property. What properties the metadata should have is defined for each of the classes described above such as music (Audio), video (Video), and photograph (Photo).

[Processing by a Client Based on Acquired Property Information]

Figure 3:
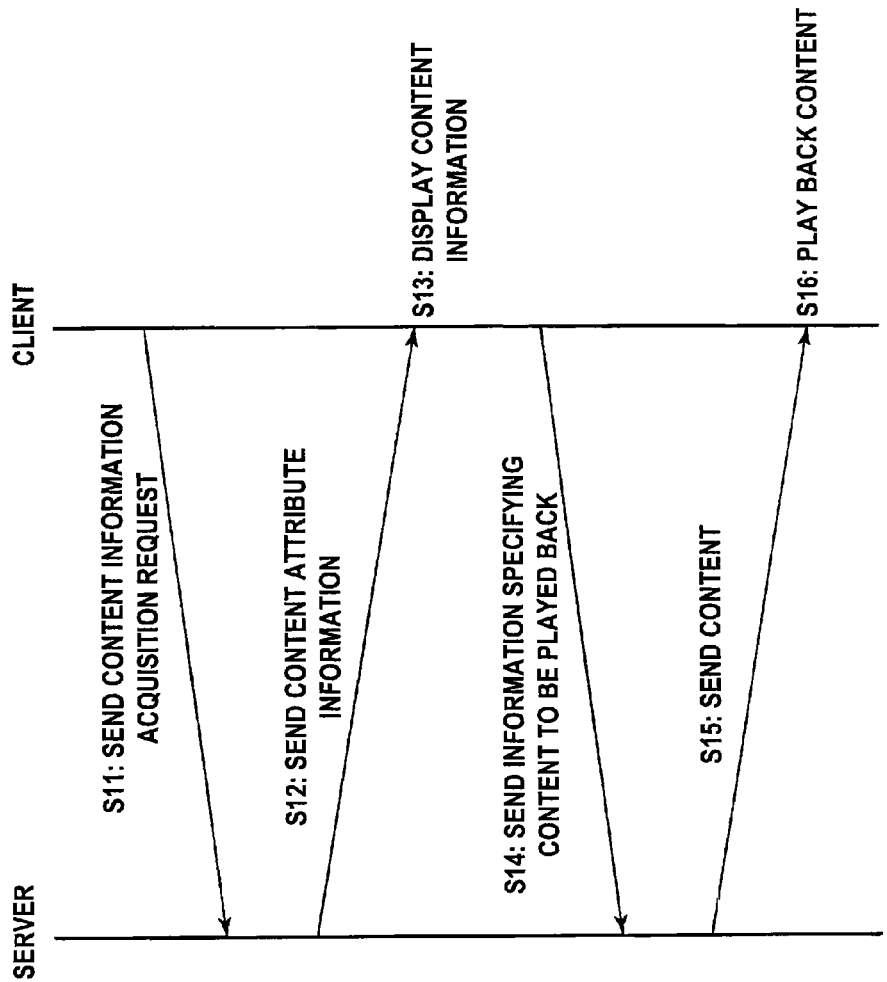
FIG. 3 is a diagram showing the processing sequence between a server and a client during content data playback processing.

For example, a client who wants to play back a content sends a content request to the server, receives the requested content from the server, and plays back the received content. With reference to FIG. 3, the following describes the general content playback procedure. First, in step S11, the client sends an acquisition request for content information stored in the server. In step S12, in response to the request from the client, the server uses XML (eXtended Markup Language) data to generate content information, such as the title and the artist name, based on the metadata corresponding to the content, and then sends the generated information to the client.

In step S13, the client displays the content information on the display according to the received XML information. For example, when the content is a music content, the list of music titles, artist names, and playback times corresponding to a plurality of music pieces stored in the server is displayed.

Next, in step S14, the client on the client apparatus selects a tune to be received from the server for playback and sends the content specification information (for example, content ID) to the server. The server acquires the content from the storage means based on the received content specification information and sends the content. In step S16, the client plays back the content received from the server. If compressed according to ATRAC or MPEG, the content is decompressed and then played back on the client side.

The usual content playback procedure is as described above. The client can acquire various types of content attribute information, that is, property information included in metadata corresponding to contents stored in the server.

[Content Acquisition Information by Specifying a Content Identifier]

The processing described above with reference to FIG. 3 is that the client acquires content information from the server, selects a content to be played back from the server based on the acquired content information, and sends the selection information to the server again to acquire the content to be played back.

In the processing sequence described above, the content information that the client acquires from the server can be saved in the storage unit of the client. Storing the content information in the storage unit allows the client to send a content transmission request to the server based on the stored content information without acquiring the content information when the client requests content transmission again.

However, as described in Background Art, a content identifier (ID) used as the content specification information is set to another value under the current UPnP specification when data is moved from one server to another.

Therefore, if the server from which the client acquired content information before still stores the same content, the client can acquire the content by sending a content transmission request to the server based on the same ID. However, if the content has been moved to some other server and the client wants to acquire the same content from the movement destination server, the client must acquire content information from the movement destination server again, extract content specification information from the acquired information, and send the extracted content specification information to the server where the content is stored.

To solve the problem described above, a unique identifier associated with a content is inherited between the devices associated with content movement, for example, between servers, in the configuration of the present invention when the content is moved between the servers so that the same content ID is kept associated with the content. That is, fixed unique identifier information is associated with a content so that, even if the content is moved, a permanently fixed identifier can be used as attribute information associated with the content.

That is, a globally and permanently fixed unique identifier (ID) is associated with a content and is set. This identifier is called a network content unique ID (NCUID: Network Content Unique ID). As long as an object remains the same content such as one content, the NCUID keeps the same value. The NCUID keeps the same value even if the logical/physical location of the object is changed within one server or between different servers.

The network content unique ID (NCUID) is set as one piece of property information that configures metadata corresponding to a content.

The server treats content-related attribute information as property information and stores it as metadata associated with the content. In response to a property information acquisition request from a client, the server presents it as the property information. FIG. 4 shows an example of property information.

FIG. 4 shows an example of a part of property information stored by the server in the storage unit corresponding to a content and presented to a client in response to a request from the client. The figure shows a property name (Property Name), a data type (Type) such as a numeric value, a character string, and so on, a multiple (Multiple) indicating whether there is a plurality of entries, and the contents of property (Property Description).

The total size (total Size) indicates the size data on the original content. A container indicates an object that is a folder in which the content is stored. The total duration (total Duration) indicates the total time of the content.

Identification information on a content is setting information stored in a data portion 301 in FIG. 4. As in the prior art, [id], [parentID], and [refID] are the identifiers (ID) that are set uniquely by each server. [id] is identification information that is unique in the content directory in the server. [parentID] is the identifier of the parent container of a container that has a parent-child relation. [refID] is the identifier of a reference object such as a related content. [parentID] and [refID] are set only when there are corresponding objects such as a parent container or a related content, but they are not set when there is no such object.

In addition to the IDs described above and as additional globally unique ID information, the configuration of the present invention has [NCUID], [refNCUID], and [parentNCUID] as content-associated property information, that is, as metadata. Note that [refNCUID] and [parentNCUID] are set when there is the corresponding objects.

[NCUID] is globally unique identification information that is set corresponding to a content or a content folder, that is, a network content unique ID (NCUID). [refNCUID] is the identifier of a reference object such as a related content and is also globally unique identification information. [parentNCUID] is the parent container identifier of a container that has a parent-child relation and is also globally unique identification information.

As in the prior art, [id], [parentID], and [refID] in the data portion 301 shown in FIG. 4 are the identifiers (ID) that are set uniquely by each server. When the content is moved between the devices such as servers, new values are assigned to those identifiers in the movement destination server for management therein. However, [NCUID], [refNCUID], and [parentNCUID] are inherited in the movement destination device (server) when the content is moved and are managed based on the same IDs.

That is, as a content is moved, the content-associated metadata is also moved. The values of [NCUID], [refNCUID], and [parentNCUID], which is property information on metadata components, are managed in the movement destination device without being rewritten.

Figure 5:
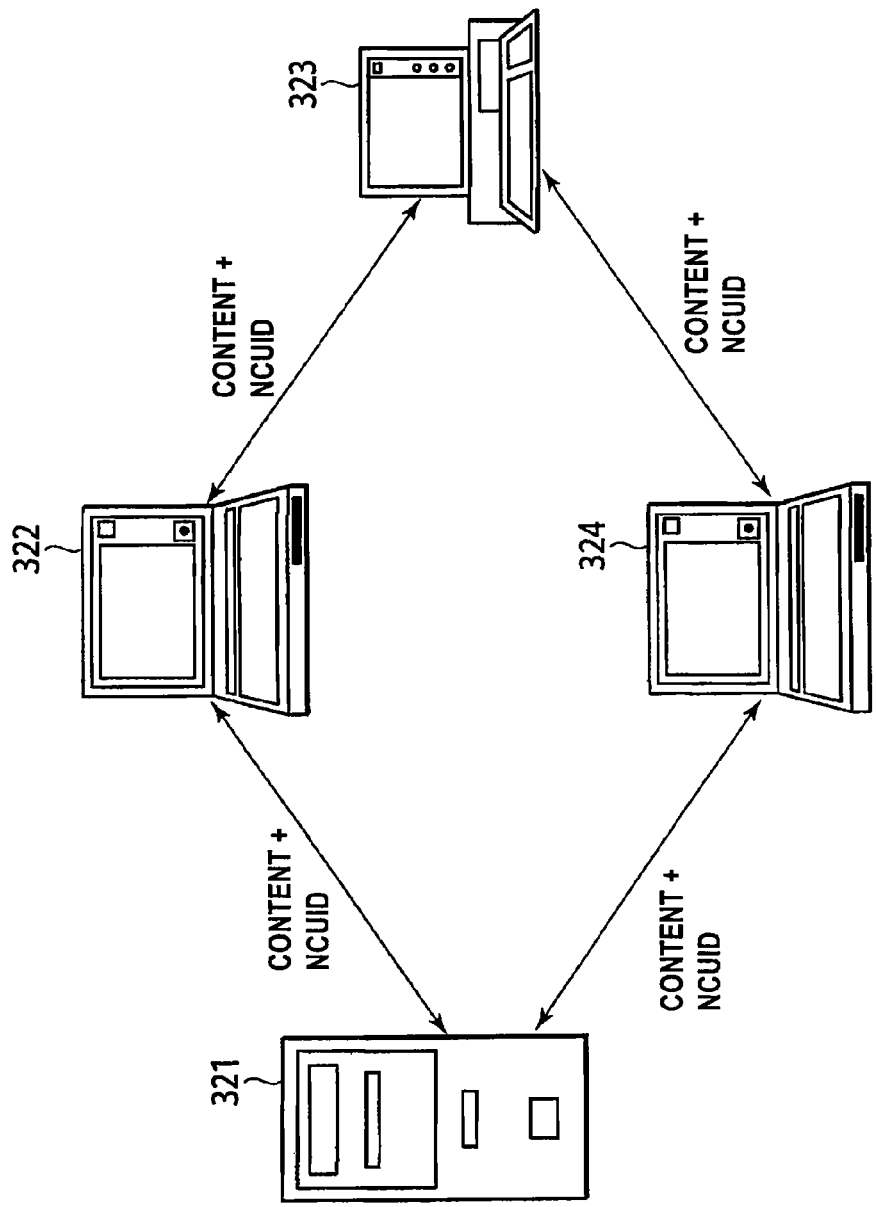
FIG. 5 is a diagram showing how an NCUID is moved and inherited when a content is moved between servers.

With reference to FIG. 5, the processing of content movement between network configuration devices will be described. FIG. 5 shows four information processing apparatuses 321, 322, 323, and 324 each having the content providing server function. They are connected, for example, to one home network, receive a content transmission request from various client apparatuses such as a player or a monitor not shown and send a content based on the request.

When a content is moved among those servers, the content-associated metadata is moved with the content as shown in the figure. The values of [NCUID], [refNCUID], and [parentNCUID], which is property information on metadata components, are also sent and received among the movement devices.

A device that stores the moved content does not rewrite the values of [NCUID], [refNCUID], and [parentNCUID], which is property information in the content-associated metadata received from the movement source, but inherits the setting values of those fields unchanged and stores them as content-associated metadata.

When a new content not having the above-described NCUID is stored, a server that stores the new content newly generates a globally unique value and sets it as the NCUID of the content. To generate the value of the NCUID, the content recording time information, the device information owned by the device, and generated random numbers are used for setting the value. More specifically, the NCUID is set, for example, as a 16- to 32-byte hexadecimal data string. Alternatively, it is also possible to provide a particular NCUID management and assignment management device that assigns a globally unique value in response to a request from the server that newly stores the content. [refNCUID] and [parentNCUID] are also set in the same manner.

By setting up an above-described globally unique ID for a content, a client who acquires content information from the server and acquires the NCUID information can store the NCUID in the storage unit of its own device and, based on the stored NCUID, issue a content request. For example, by setting the NCUID as a bookmark related to the content title, the client can click the title to send a content transmission request to the servers with the NCUID as the search key, receive the desired content from the server, and play back the content.

Based on the content information received from the server, the client apparatuses generates a unique identifier management table such as the one shown in FIG. 6, that is, an NCUID management table, and stores the generated table in the storage unit. The NCUID management table shown in FIG. 6 is a table that establishes the association among a content title, an artist, and an NCUID included in the property information that is a metadata component of the content.

In the example shown in FIG. 6, two pieces of property information, content title and artist, is associated with the NCUID that is unique identifier information. One piece of property information, such as a title, may be associated with the NCUID, or any user-generated data may be associated with the NCUID, for use in management.

When a client wants to receive and play back a content, which is registered in the table, from the same server or a different server again, the client sends a content request using the NCUID in the table as the search key, that is, a content search or content transmission request, to the server. If the client knows the content storage server, the client sends the NCUID to the content storage server for executing the processing. If the content storage server is not known, the NCUID is multicast to a plurality of content storage servers to execute search processing in the servers and to receive the content from the server where the content is stored.

Figure 7:
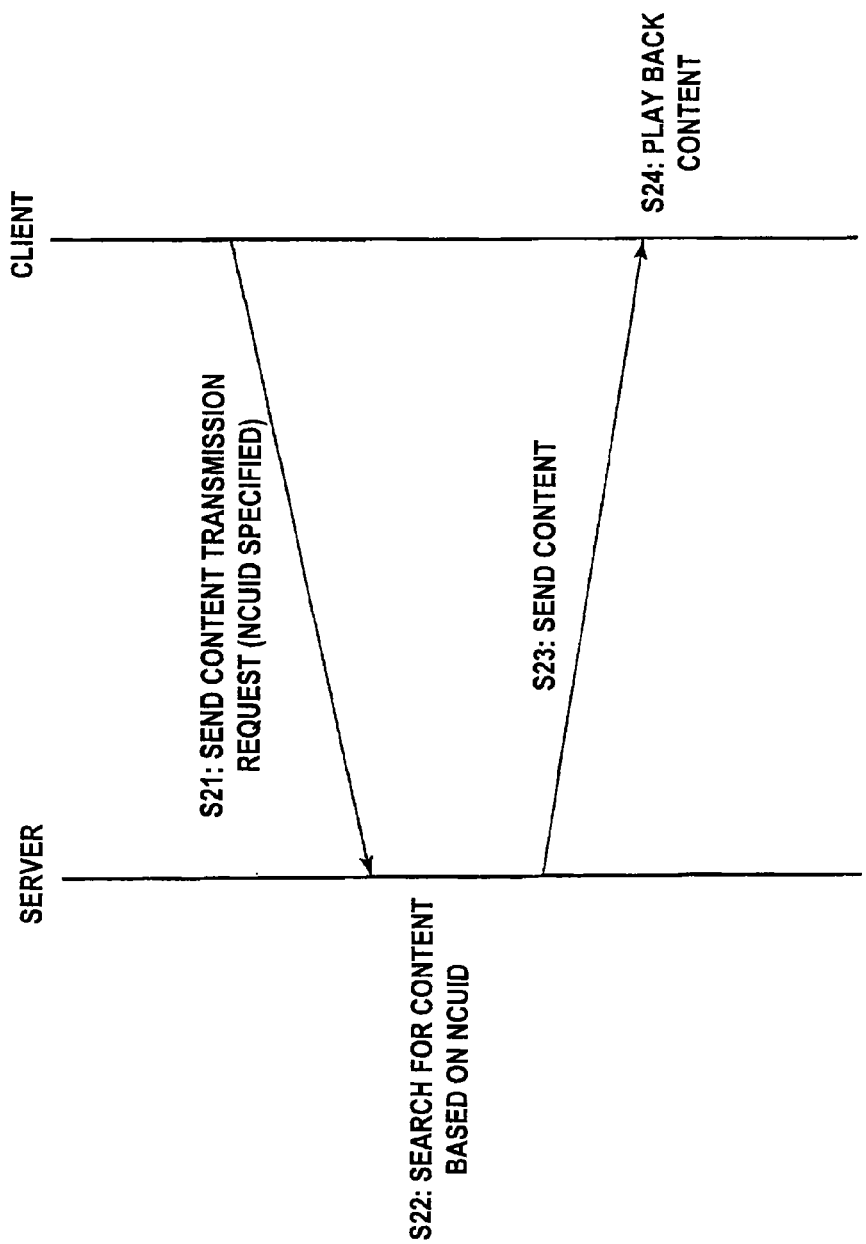
FIG. 7 is a diagram showing the content request processing sequence to which an NCUID is applied.

With reference to FIG. 7, the content acquisition processing sequence by a client, in which the content-associated NCUID information is stored, will be described.

In step S21, the client selects a content to be played back, for example, based on the NCUID management table shown in FIG. 6. The client machine generates a content transmission request packet, in which the NCUID is stored, according to the selected information and sends the generated packet to the server. It is also possible for the client machine to set up the NCUID as a bookmark related to the content title so that a content transmission request, which specifies the NCUID as the search key, can be sent to the servers simply by clicking the title.

If the content storage server is known, the content transmission request is sent to that content storage server as described above. If the content storage server is not known, the content transmission request is multicast to a plurality of content storage servers.

Upon receiving the content transmission request, the server performs content search processing in step S22 based on the NCUID stored in the received packet and, in step S23, sends the searched-for and extracted content to the client. In step S24, the client plays back the content received from the server.

Figure 8:
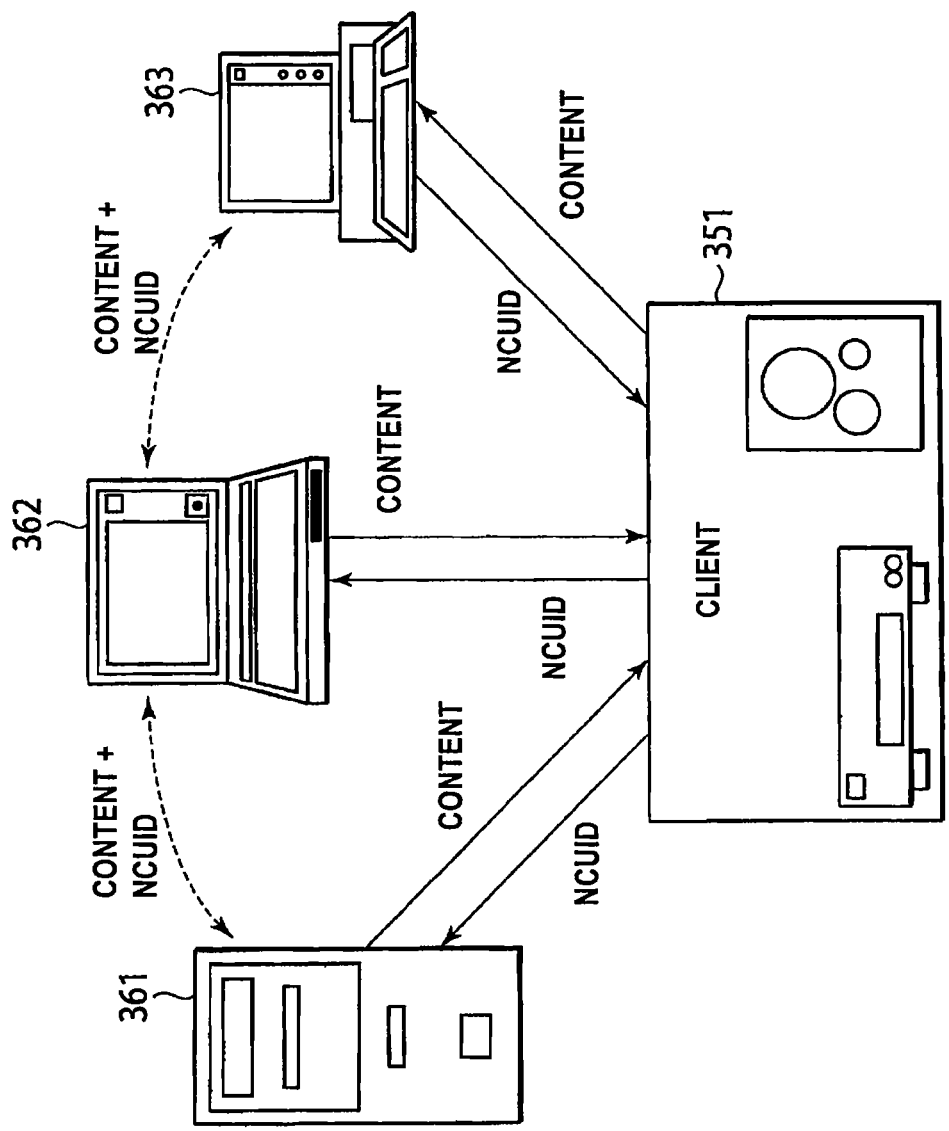
FIG. 8 is a diagram showing the transmission and reception processing of a content and an NCUID between a server and a client.

With reference to FIG. 8, the data flow of a content and an NCUID will be described. FIG. 8 shows one client 351 and three servers 361, 362, and 363. In response to a request from the client 351, the servers 361, 362, and 363 send a content to the client 351.

When a content is moved among the servers 361, 362, and 363, the content as well as content-associated metadata is sent and received and the NCUID in the metadata as well as its value is stored in the destination server. Note that the NCUID includes [NCUID], [refNCUID], and [parentNCUID] described above.

The client 351 can store the NCUID, which is set in the previously acquired content information, in the storage unit and send a content transmission request, which uses the stored NCUID as the search key, to the servers 361, 362, and 363. The servers perform content search based on the NCUID, which is received from the client, and sends the extracted content to the client 351.

Figure 9:
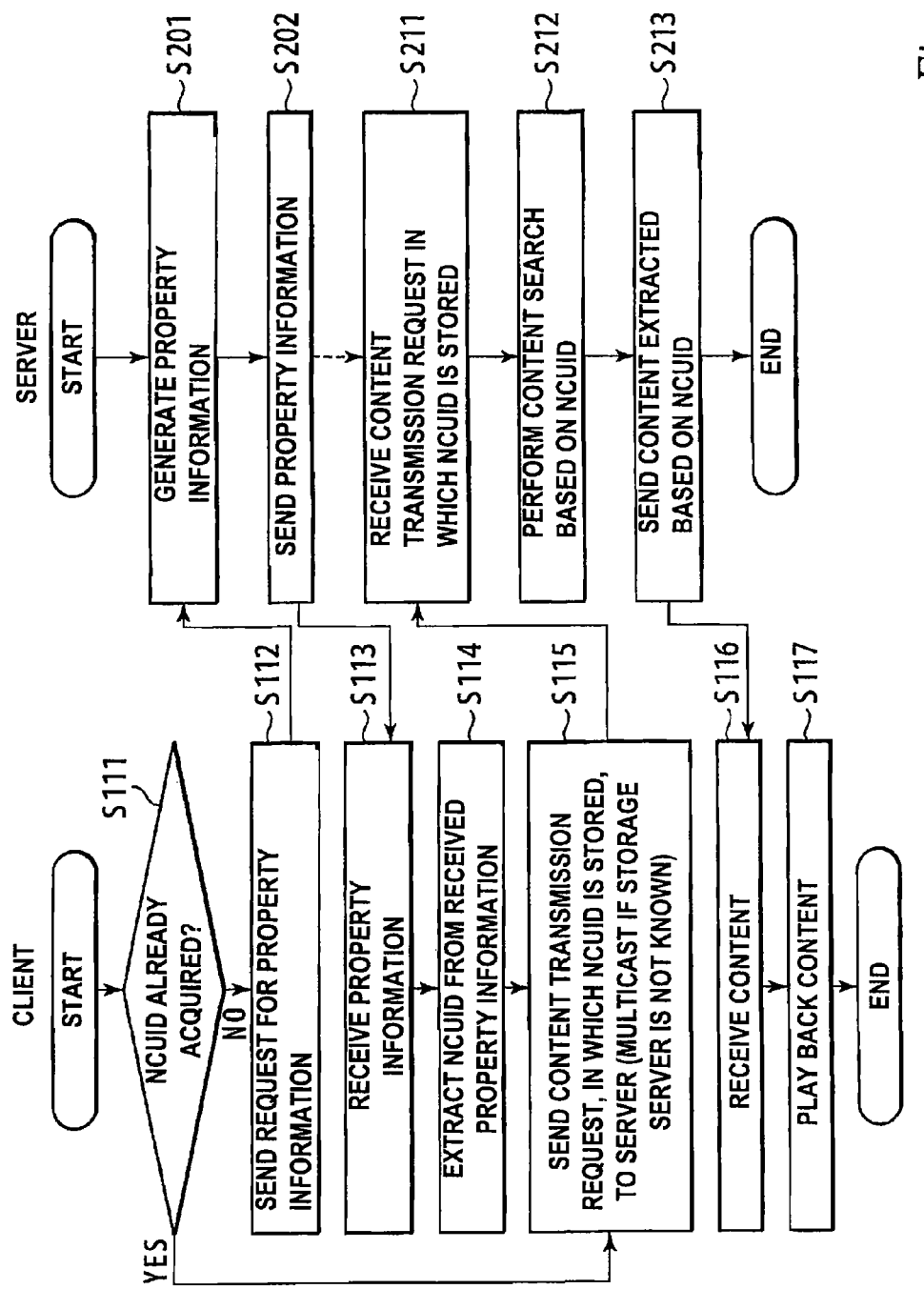
FIG. 9 is a diagram showing a flowchart describing the processing procedure of a server apparatus (first apparatus) and a client apparatus (second apparatus) during content acquisition processing by a client.

With reference to FIG. 9, the procedure executed by a client and the server during the NCUID-based content acquisition processing will be described. In FIG. 9, the left-hand side shows the client processing and the right-hand side shows the server processing.

The client who wants to acquire a content determines in step S111 whether the NCUID of the content to be played back is already acquired. For example, the client determines whether the NCUID is already acquired either by referencing the NCUID management table shown in FIG. 6 or based on the setting status of a bookmark.

If it is found that the NCUID is not stored, control is passed to step S112 and the property information request processing is performed. That is, the client issues a request to acquire the content information owned by the server. In step S201, the server generates content information, such as the title and the artist name, and various types of property information, such as the NCUID, using XML (eXtended Markup Language) data according to the request from the client and based on the content-associated metadata and, in step S202, sends the created property information to the client.

Upon receiving the property information composed of the XML data in step S113, the client displays the content information on the display according to the received XML information. For example, if the content is a music content, the list of music titles, artist names, playback times, and NCUIDs associated with a plurality of music pieces owned by the server is displayed. In step S114, the client selects a tune, which is received from the server and which is to be played back, and extracts the NCUID as the content specification information.

Next, in step S115, the client generates a content transmission request packet, in which the extracted NCUID is stored, and sends it to the server. If the NCUID is already stored in the storage unit, the processing in steps S112-S114 may be omitted; in this case, the NCUID stored in the storage unit is extracted and then a content transmission request packet in which the extracted NCUID is stored can be generated and sent to the server.

The transmission processing of the content transmission request packet is executed as the unicast transmission processing for the content storage server or as the multicast transmission processing with a plurality of servers as the destination.

The server receives the content transmission request, in which the NCUID is stored, in step S211, performs content search based on the NCUID in step S212, and sends the extracted content to the client in step S213.

The client receives the content in step S116, and plays back the received content in step S117.

As described above, an NCUID used as a content identifier associated with a content is a globally unique value and remains unchanged even when the content is moved between servers. Therefore, by storing the NCUID in the storage unit in its own device and, at a later content acquisition time, issuing a content request with the stored NCUID as the search key, a client can acquire the same content from some other server and so perform content management more effectively and correctly.

[Functional Configuration of Server and Client]

The hardware configuration of a server and a client apparatus was described before with reference to FIG. 2. The CPU that functions as the control unit executes the processing described above according to the programs stored in the storage units of the server and the client respectively.

For example, the processing executed by the CPU on the server side includes the NCUID inheritance management processing executed when a content is moved between servers, the XML data generation processing in which content-associated metadata is acquired according to a request from a client and XML data is generated based on property information, the content search processing based on the NCUID that is performed in response to a request form a client, and the extracted content transmission processing. The processing performed on the client side includes the processing in which a content information list is displayed on the display based on XML data composed of property information received from the server. In addition, the CPU executes the processing in which a check is made as to whether or not a NCUID is stored in the storage unit of its own device, the generation and transmission processing of a content transmission request packet in which the NCUID is stored, and the playback control processing of a received content.

Figure 10:
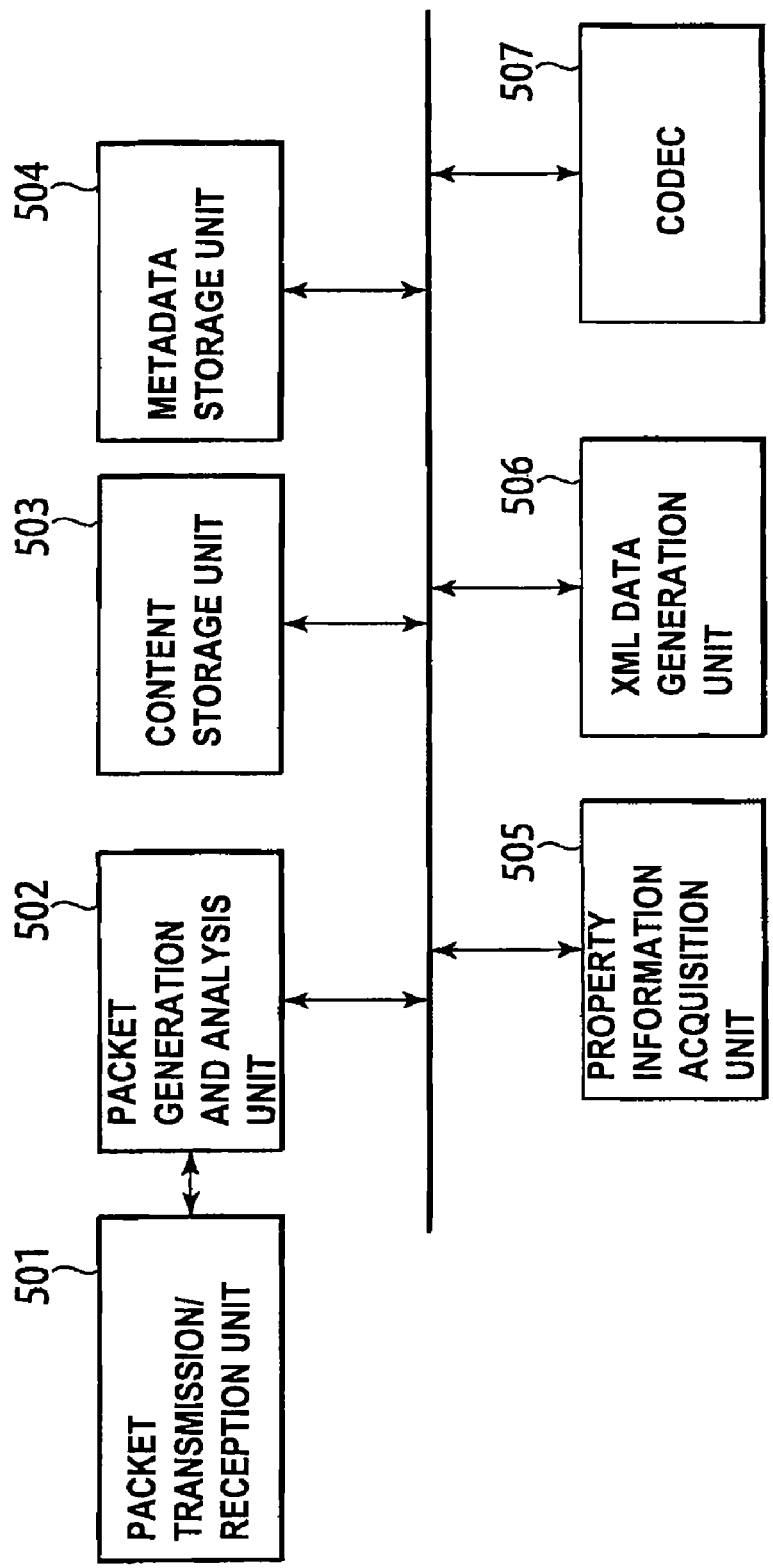
FIG. 10 is a block diagram showing the processing function of a server.
Figure 11:
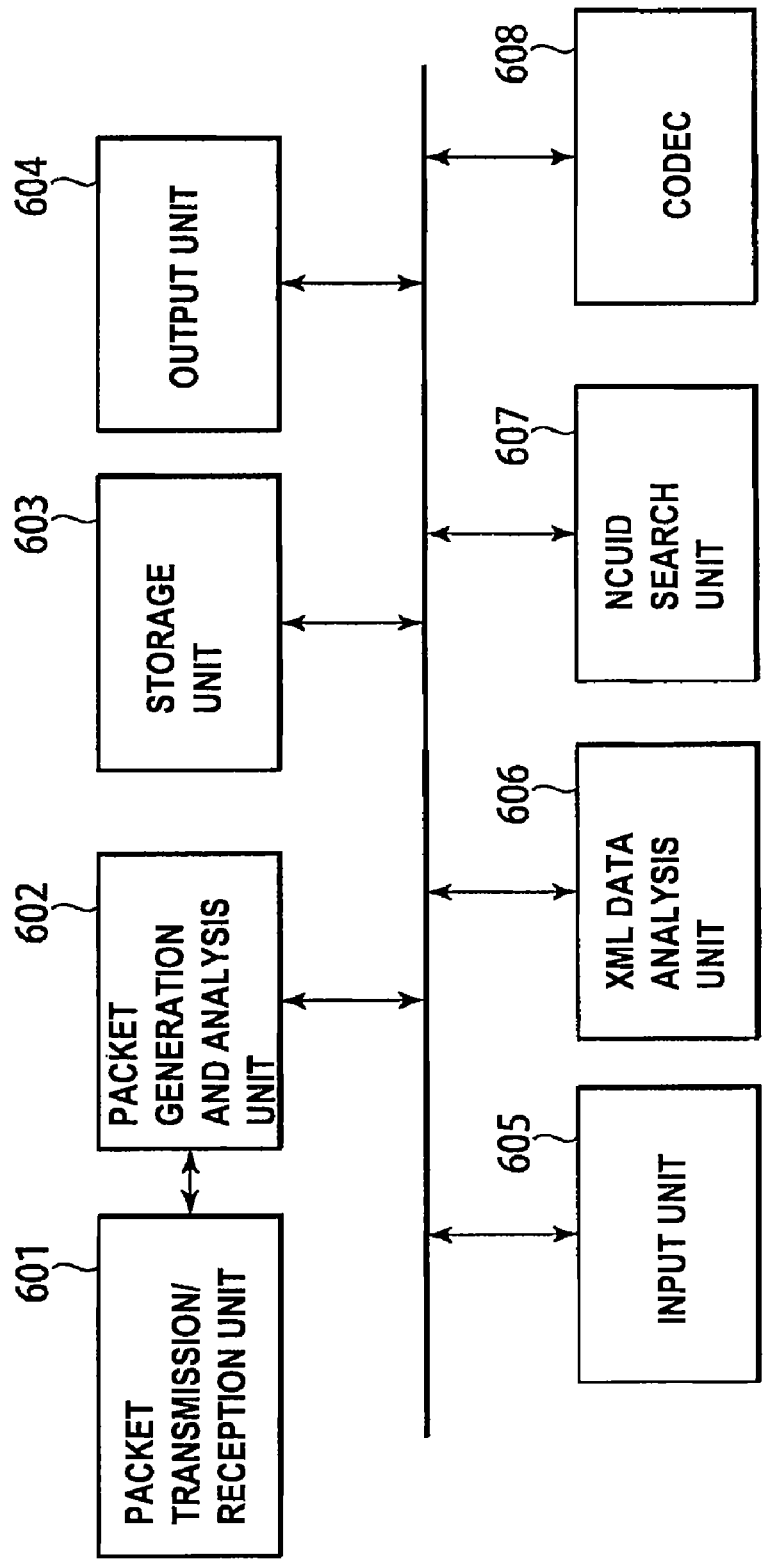
FIG. 11 is a block diagram showing the processing function of a client.

Basically, the processing described above is performed according to the pre-stored processing programs under control of the CPU that functions as the control unit of server and client devices. The processing executed by the CPU as the control unit, as well as the data stored in the storage unit, will be described with reference to FIG. 10 and FIG. 11. FIG. 10 is a block diagram showing the major functional configuration of a server, and FIG. 11 is a block diagram showing the major functional configuration of a client.

First, with reference to the block diagram showing the functional configuration of a server in FIG. 10, the processing of the server will be described. A packet transmission/reception unit 501 transmits a packet to a client and receives a packet from a client. A packet generation and analysis unit 502 generates a transmission packet and analyzes a received packet. This unit sets the address of a packet, identifies an address, stores data in the data portion, and acquires data from the data portion.

A content storage unit 503 stores the contents owned by the server. The contents include original contents as well as content data generated by converting the data of the original contents. A metadata storage unit 504 is a storage unit that stores metadata that is attribute information associated with the contents.

As described above, the metadata storage unit 504 stores property information that constitutes metadata, and the property information includes [NCUID] that is a globally unique ID associated with a content. In addition, if there are the corresponding objects, the values of the identifier [refNCUID] of a reference object such as a related content and [parentNCUID] that is the identifier of a content having the parent-child relation are set.

A property information acquisition unit 505 acquires metadata, which is content attribute information, from the metadata storage unit 504 based on a property information acquisition request packet received from a client.

An XML data generation unit 506 generates XML data to be sent to a client based on the metadata acquired by the property information acquisition unit 505. A codec 507 codes and decodes original content data. For example, the codec executes data conversion based on ATRAC3 and MPEG4. The codec function varies from server to server and, according to the function, resource data that can be supplied to a client also varies.

Next, with reference to FIG. 11, the functional configuration of a client device will be described. A packet transmission/reception unit 601 transmits a packet to a server and receives a packet from the server. A packet generation and analysis unit 602 generates a transmission packet and analyzes a received packet. The unit not only analyzes data stored in a packet but also sets the address of a packet, identifies the address of a packet, stores data in the data portion, and acquires data from the data portion. When a content transmission request packet is generated, the unit generates a packet in which the NCUID is stored as the payload and sends the packet to the server via the packet transmission/reception unit 601.

A storage unit 603 stores a content included in a packet received from the server and the content-associated metadata, that is, property information such as an NCUID. For example, like the NCUID management table described with reference to FIG. 6, the storage unit associates an NCUID with property information such as a content title and an artist and stores the associated information.

An output unit 604 includes a speaker and a display used for the content playback processing. The display is used to output a content information list generated based on content information received from the server and also to display the NCUID management table described with reference to FIG. 6. An input unit 605 is a keyboard and other data input means used to enter playback content specification information and used for various types of input processing for playback processing.

An XML data analysis unit 606 analyzes XML data composed of property information received from the server, generates a content information list based on the analysis data, and outputs the generated list on the display that is an output unit.

An NCUID search unit 607 acquires an NCUID from property information received from the server and stored in the storage unit 603. This unit performs search based on the NCUID management table described with reference to FIG. 6 or performs search based on bookmark information that is set associated with a content title. The searched-for NCUID is set in a content transmission request packet, generated by the packet generation and analysis unit 602, as the payload and is sent to the server.

A codec 608 decodes content data received from the server. For example, the unit converts data based on ATRAC3 and MPEG4. The unit may also be configured to re-code decoded data and to store the re-coded data in the storage unit 603.

The server and the client functionally have the functions shown in FIG. 10 and FIG. 11 for executing the processing described above. Note that the block diagrams shown in FIG. 10 and FIG. 11 are block diagrams for describing the functions and, in practice, the various processing programs are executed under control of the CPU in the hardware configuration including the PC shown in FIG. 2.

The present invention has been described in detail with reference to the preferred embodiment thereof. However, it is apparent that those skilled in the art can make various changes and additions to the embodiment without departing from the spirit of the present invention. That is, the present invention has been disclosed solely for purposes of illustration and the description is not intended to be construed in a limiting sense. To determine the spirit of the present invention, reference should be made to the claims.

The sequence of processing described in the specification can be executed by hardware, software, or a combination of the both. To execute the processing by the software, the program storing the processing sequence is installed into, and executed in, the memory of the computer built in the special hardware or is installed into, and executed in, a general-purpose computer that can execute various types of processing.

For example, the program can be recorded in advance on a hard disk or in a ROM (Read Only Memory) that is a recording medium. Alternatively, the program can be stored (recorded) temporarily or permanently on a removal recording medium such as a flexible disk, a CD-ROM (Compact Disc Read Only Memory), an MO (Magneto optical) disc, a DVD (Digital Versatile Disc), a magnetic disk, or a semiconductor memory. Those removable recording media can be provided as so-called packaged software.

The program can be installed from one of the removable recording media described above into a computer. In addition, the program can be transferred from a download site to a computer wirelessly or via cable through a network such as a LAN (Local Area Network) or the Internet. The computer can receive the program sent in this way and install the program onto a recording medium such as a built-in hard disk.

The various types of processing described in the specification can be executed not only on a time-series basis according to the description but also in parallel or individually according to the processing capability of the device where processing is executed or according to the need. The system in this specification, which refers to a logically aggregated configuration of a plurality of apparatuses, is not limited to a system where the apparatuses, each having its own configuration, are included in one cabinet.

INDUSTRIAL APPLICABILITY

As described above, according to the configuration of the present invention, the content providing server sets content-associated unique identifier information as property information that is a component of content-associated metadata, maintains the unique identifier information as content-associated metadata without changing the unique identifier information even if the logical/physical position of a content stored in the storage unit is changed, and maintains a setting value of unique identifier information, which is set associated with a received content, as metadata associated with the received content without changing the setting value of the unique identifier information. Therefore, even if a content is moved between servers, a client can acquire the content based on the unique identifier.

According to the configuration of the present invention, a client that executes content playback processing generates a unique identifier management table associating content-associated unique identifier information, included in property information in content attribute information received from the server, with other property information and stores the generated table in a storage unit. Because the unique identifier remains unchanged even if the content is moved between devices, the content can be acquired based on the unique identifier that is stored data without acquiring attribute information from a server in which the content is newly stored and therefore the content can be acquired more efficiently.

The invention claimed is:

1. An information processing system connected to a network that executes content transmission processing in response to a request from a client through the network, the system comprising:

a first apparatus and a second apparatus, the first apparatus including:
- a storage unit for storing a content and metadata associated with the content;
- a data transmission/reception unit for executing data transmission/reception processing; and
- a control unit for associating with the content a unique identifier as property information that is a component of the metadata, and for maintaining the unique identifier as metadata without changing the unique identifier when the content is transmitted to the second apparatus for storage, the unique identifier including at least two of a network content unique identifier, a reference object unique identifier, and a parent object unique identifier, wherein:
- upon storing the content a first time, the control unit assigns the unique identifier to the content,
- the first apparatus receives the request for the content,
- the first apparatus provides the unique identifier to the client,
- the second apparatus receives a second request for the content, the second request including the unique identifier, and
- the second apparatus provides the content to the client based on the unique identifier.

2. The information processing system of claim 1, wherein the second apparatus searches for the content based on the unique identifier.

3. The information processing system of claim 1, wherein the first apparatus provides the second apparatus with the unique identifier when the first apparatus transmits the content to the second apparatus.

4. The information processing system of claim 1, wherein:
- the first apparatus creates the network content unique identifier based on content recording time information, device information, and a random number, and
- the control unit manages the network content unique identifier, the reference object unique identifier, and the parent object unique identifier as fixed values of property information constituting metadata associated with the content.

5. The information processing system of claim 1, wherein the unique identifier is stored in a unique identifier management table.

6. An information processing method for executing content transmission processing in response to a request from a client through a network, the method comprising:
- storing, by a first apparatus, content and metadata associated with the content;
- associating with the content a unique identifier as property information that is a component of the metadata, the unique identifier including at least two of a network content unique identifier, a reference object unique identifier, and a parent object unique identifier;
- receiving the request from the client for the content;
- providing the unique identifier to the client;
- transferring the content to a second apparatus while maintaining the unique identifier as metadata without changing the unique identifier;
- receiving a second request from the client for the content stored by the second apparatus; and
- providing the content to the client,
- wherein upon storing the content a first time, the unique identifier is assigned to the content as a fixed value associated with the content.

7. The information processing method of claim 6, further comprising performing a content search based on the unique identifier in response to the request, the request including the unique identifier.

8. The information processing method of claim 6, further comprising outputting, to the second apparatus, the unique identifier when transferring the content.

9. The information processing method of claim 6, wherein:
- the network content unique identifier is created based on content recording time information, device information, and a random number, and
- a control unit manages the network content unique identifier, the reference object unique identifier, and the parent object unique identifier as fixed values of property information constituting metadata associated with the content.

10. The information processing method of claim 6, further including storing the unique identifier in a unique identifier management table.

11. A computer-readable medium comprising program instructions which, when executed by a processor, perform a method for executing content transmission processing in response to a request from a client through a network, the method comprising:
- storing, by a first apparatus, content and metadata associated with the content;
- associating with the content a unique identifier as property information that is a component of the metadata, the unique identifier including at least two of a network content unique identifier, a reference object unique identifier, and a parent object unique identifier;
- receiving the request from the client for the content;
- providing the unique identifier to the client;
- transferring the content to a second apparatus while maintaining the unique identifier as metadata without changing the unique identifier;
- receiving a second request from the client for the content stored by the second apparatus; and
- providing the content to the client,
- wherein upon storing the content a first time, the unique identifier is assigned to the content as a fixed value associated with the content.

12. The computer-readable medium of claim 11, wherein the method further comprises performing a content search based on the unique identifier in response to the request, the request including the unique identifier.

13. The computer-readable medium of claim 11, wherein the method further comprises outputting, to the second apparatus, the unique identifier when transferring the content.

14. The computer-readable medium of claim 11, wherein:
- the network content unique identifier is created based on content recording time information, device information, and a random number, and
- a control unit manages the network content unique identifier, the reference object unique identifier, and the parent object unique identifier as fixed values of property information constituting metadata associated with the content.

15. The computer-readable medium of claim 11, wherein the method further comprises storing the unique identifier in a unique identifier management table.

* * * * *